United States Patent
Sauer

(10) Patent No.: US 12,490,974 B2
(45) Date of Patent: Dec. 9, 2025

(54) SUTURE SECURING ASSEMBLY

(71) Applicant: LSI Solutions, Inc., Victor, NY (US)

(72) Inventor: Jude S. Sauer, Pittsford, NY (US)

(73) Assignee: LSI Solutions, Inc., Victor, NY (US)

( * ) Notice: Subject to any disclaimer, the term of this patent is extended or adjusted under 35 U.S.C. 154(b) by 309 days.

(21) Appl. No.: 18/229,443

(22) Filed: Aug. 2, 2023

(65) Prior Publication Data

US 2024/0041448 A1    Feb. 8, 2024

Related U.S. Application Data

(60) Provisional application No. 63/394,528, filed on Aug. 2, 2022.

(51) Int. Cl.
*A61B 17/04* (2006.01)
*A61B 17/00* (2006.01)

(52) U.S. Cl.
CPC ........... *A61B 17/0487* (2013.01); *A61B 2017/00004* (2013.01); *A61B 2017/00477* (2013.01)

(58) Field of Classification Search
CPC ...... A61B 2017/045; A61B 2017/0451; A61B 2017/0454; A61B 2017/0446; A61B 2017/0487
See application file for complete search history.

(56) References Cited

U.S. PATENT DOCUMENTS

| | | |
|---|---|---|
| 4,382,453 A | 5/1983 | Bujan et al. |
| 5,282,832 A | 2/1994 | Toso et al. |
| 5,630,824 A | 5/1997 | Hart |
| 7,033,379 B2 | 4/2006 | Peterson |
| 7,090,690 B2 | 8/2006 | Foerster et al. |
| 9,119,614 B2 | 9/2015 | Gadladge |
| 9,636,106 B2 | 5/2017 | Meier et al. |
| 10,327,762 B2 | 6/2019 | Lear |

(Continued)

FOREIGN PATENT DOCUMENTS

| | | |
|---|---|---|
| DE | 102018103977 | 8/2019 |
| EP | 1334695 | 8/2003 |

(Continued)

OTHER PUBLICATIONS

International Search Report and Written Opinion for International Application No. PCT/US2023/029308 filed Aug. 2, 2023, 8 pages.

*Primary Examiner* — Alexander J Orkin
(74) *Attorney, Agent, or Firm* — Michael E. Coyne

(57) ABSTRACT

A suture fastening assembly includes a central hub having a base portion having an aperture that extends therethrough and a base securing surface that extends along a base securing ramp extending along an axis that forms an acute angle with an axis of the central hub. The assembly also includes a locking collar configured to be coupled to the central hub, the locking collar including a collar securing ramp having a collar securing surface that extends along a collar ramp axis forming an acute angle with the hub axis. When a segment of suture is disposed through the aperture of the base portion and when the locking collar is secured to the central hub, a first portion of the suture is engaged by portions of the base securing surface and a second portion of the suture is engaged by portions of the collar securing surface.

10 Claims, 12 Drawing Sheets

(56)     References Cited

U.S. PATENT DOCUMENTS

| | | | |
|---|---|---|---|
| 2007/0021781 A1* | 1/2007 | Jervis | A61B 17/06061 |
| | | | 606/232 |
| 2007/0276437 A1 | 11/2007 | Call et al. | |
| 2011/0106155 A1 | 5/2011 | Theobald et al. | |
| 2013/0158600 A1 | 6/2013 | Conklin et al. | |
| 2013/0226237 A1 | 8/2013 | Stanley et al. | |
| 2014/0081326 A1 | 3/2014 | Takahashi | |
| 2014/0163615 A1 | 6/2014 | Gadlage et al. | |
| 2014/0352594 A1 | 12/2014 | Kruger | |
| 2017/0014124 A1* | 1/2017 | Lear | A61B 17/0487 |
| 2021/0015479 A1* | 1/2021 | Smith | A61F 2/0811 |

FOREIGN PATENT DOCUMENTS

| | | |
|---|---|---|
| EP | 2628451 | 8/2013 |
| EP | 2821017 | 6/2022 |
| WO | 2016007973 | 1/2016 |

\* cited by examiner

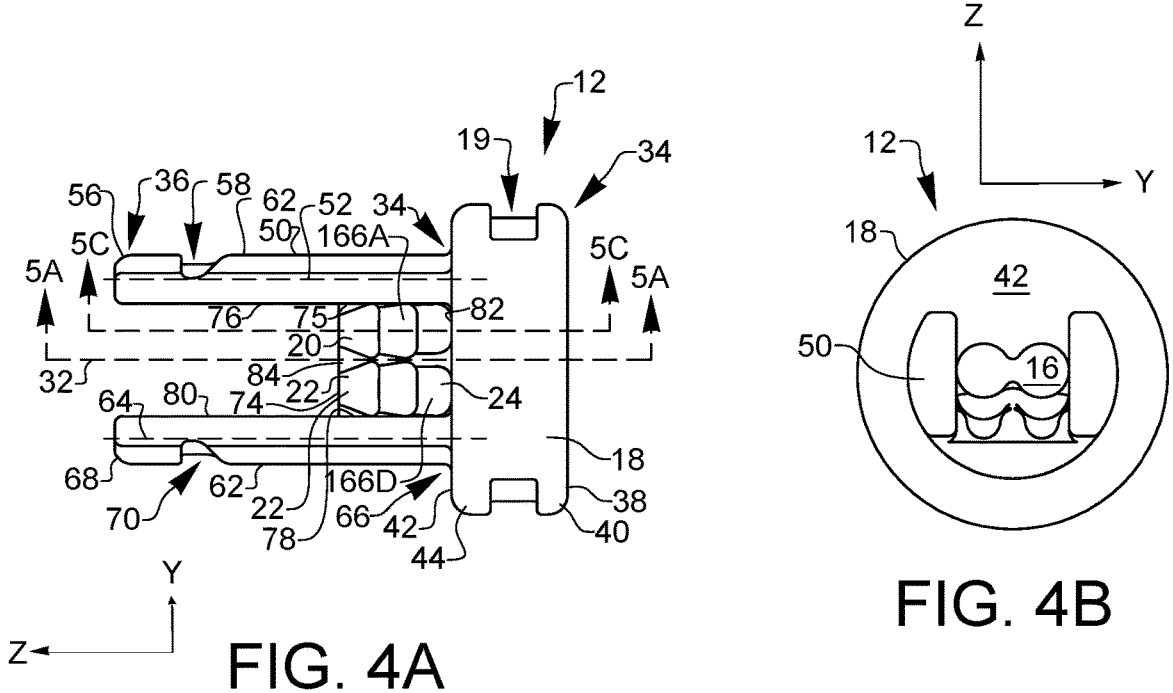
FIG. 4A
FIG. 4B
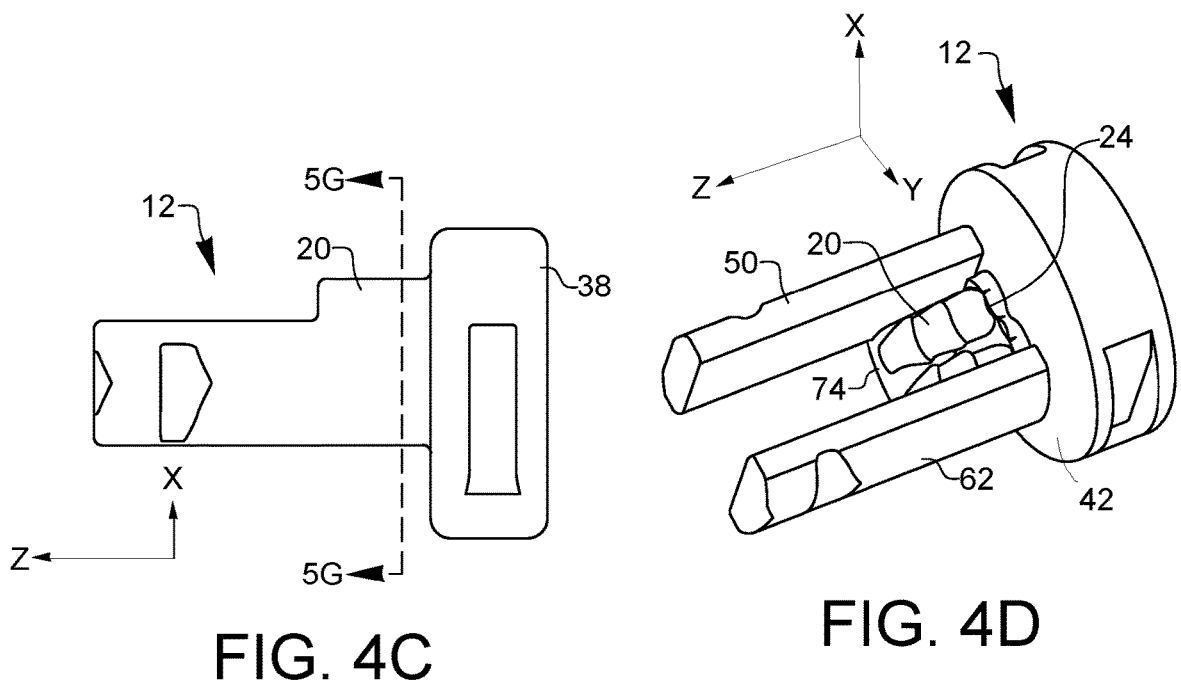
FIG. 4C
FIG. 4D

SUTURE SECURING ASSEMBLY

CROSS-REFERENCE TO RELATED APPLICATIONS

This application claims the benefit of U.S. Provisional Patent Application No. 63/394,528, filed Aug. 2, 2022, which is incorporated by reference herein in its entirety.

FIELD OF THE INVENTION

The claimed invention relates to surgical devices, and more specifically to an assembly for securing suture.

BACKGROUND OF THE INVENTION

Sutures are sterile fibers used to close wounds and provide strength during the wound-healing process. In antiquity, metal wires and natural fibers were used for this purpose. More recently, synthetic fibers like polyamides, polyesters, polypropylene, etc., which are more compatible to human tissues, were introduced. These suture materials are biostable and retain their strength for several years. After successful wound healing, the suture has to be removed in a separate operation.

To avoid a separate procedure for removing sutures, bioabsorbable sutures have been developed. Such bioabsorbable sutures degrade in the body environment and lose their strength within a few months. The use of plain catgut, a collagen-based material of natural origin, as an absorbable suture was described in antiquity, and more modern examples of absorbable suture include polylactic acid (PLA), an absorbable, nontoxic, and nonirritating synthetic material useful for surgical applications. This led to introduction of the polymer of glycolic acid and its copolymer with lactic acid as successful materials for absorbable sutures.

While absorbable sutures are widely used, it is difficult to reliably secure the ends of such absorbable sutures when using smaller sizes, such as 6-0, 7-0, 8-0, 9-0, 10-0, and 11-0 sutures. Accordingly, there is a need for a suture fastener for the smaller suture sizes that is easy to use, reliable, and is made from bioabsorbable materials.

BRIEF DESCRIPTION OF THE DRAWINGS

FIGS. 4A to 4D are various views of an embodiment of a central hub of the suture fastening assembly;

DETAILED DESCRIPTION OF THE INVENTION

Figure 2B:
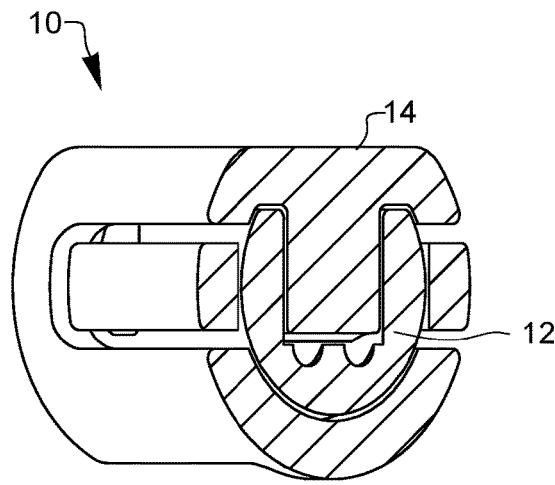
FIG. 2B is a cross-sectional view of the embodiment of the suture fastening assembly of FIG. 1A taken along section line 2B-2B.
Figure 2A:
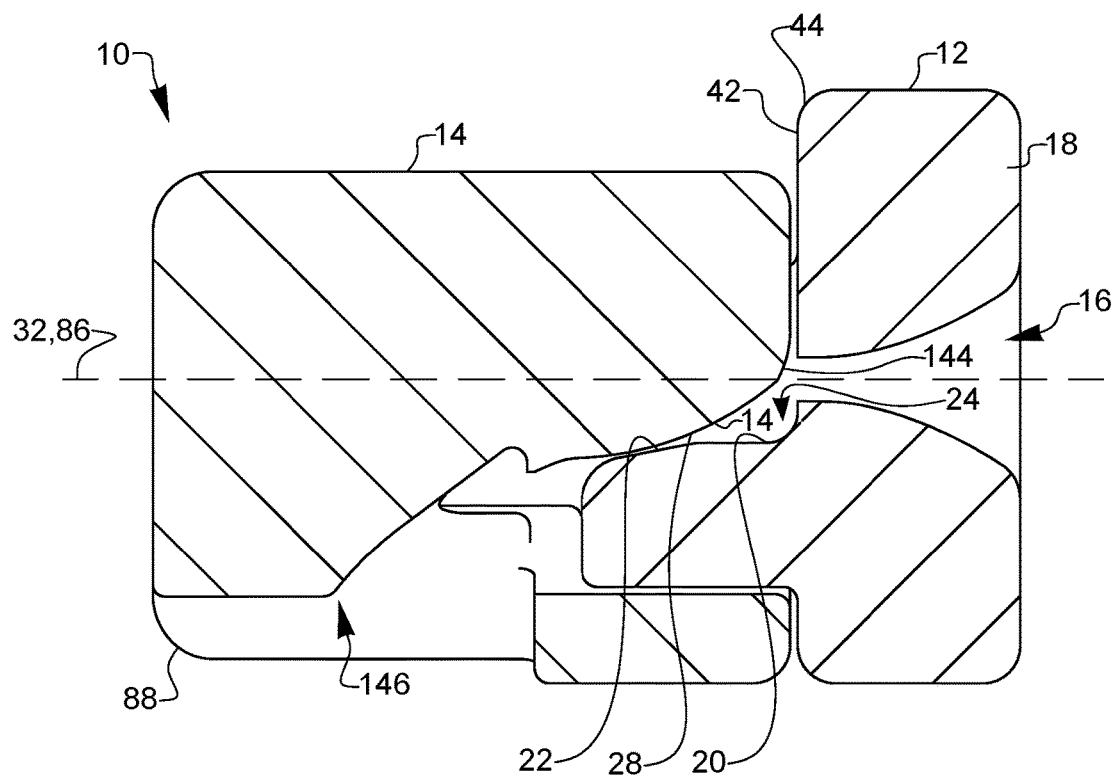
FIG. 2A is a cross-sectional view of the embodiment of the suture fastening assembly of FIG. 1B taken along section line 2A-2A.
Figure 3A:
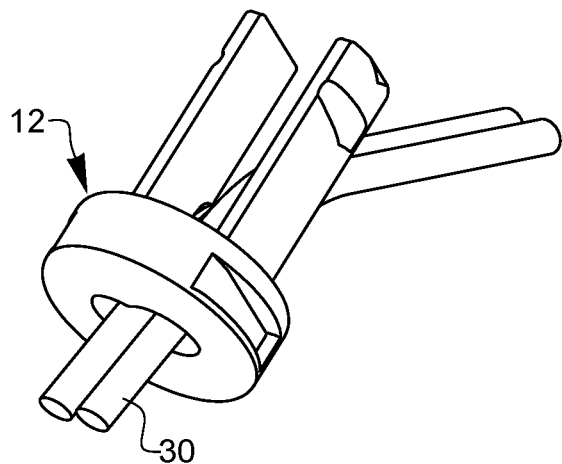
FIGS. 3A to 3C are perspectives views of an embodiment of a central hub and locking collar being assembled into the embodiment of the suture fastening assembly of FIG. 1A.

As illustrated in FIGS. 1A to 1E, an embodiment of a surgical fastening assembly 10 includes a central hub 12 and a locking collar 14 secured to the central hub 12. As illustrated in the cross-sectional view of FIG. 2A, the central hub 12 includes an aperture 16 that extends through a base portion 18 of the central hub 12, and a base securing ramp 20 extends from a surface of the base portion 18. The base securing ramp 20 has a first end 24 that is disposed at or adjacent to the surface of the base portion 18 and is adjacent to an end of the aperture 16, and a base securing surface 22 extends along a portion of the base securing ramp 20. The locking collar 14 includes a collar securing ramp 26 having a collar securing surface 28. When a segment of suture 30 is disposed through the aperture 16 of the base portion 18 and along the base securing surface 22 of the base portion 18 (as illustrated in FIG. 3A) and when the locking collar 14 is secured to the central hub 12 (by one or more snap-fit features, for example), as shown in in FIG. 3C, a first portion of the segment of suture 30 is engaged by one or more portions of the base securing surface 22 and a second portion of the segment of suture 30 is engaged by one or more portions of the collar securing surface 28 such that the segment of suture is secured between the base securing surface 22 and the collar securing surface 28. In some embodiments, the central hub 12 and the locking collar 14 may each be made or manufactured from a bioabsorbable material such that the central hub 12 and the locking collar 14 are configured to degrade within the body cavity after a minimum amount of time. During a minimally invasive procedure, a surgeon may insert the segment of suture 30 through the aperture 16 and along the along the base securing surface 22, and then couple the locking collar 14 to the central hub 12 to secure the segment of suture 30 within the surgical fastening assembly 10. The engagement of the central hub 12 and a locking collar 14 allows for smaller diameters of suture (such as 8-0, 9-0, 10-0, and 11-0 sutures) to be reliably and easily secured by the surgical fastening assembly 10.

Turning to the surgical fastening assembly 10 in more detail, the central hub 12 extends along a hub axis 32 from a first end 34 to a second end 36, as illustrated in FIG. 4A. The hub axis 32 may extend along or parallel to the Z-axis of the reference coordinate system provided in FIGS. 4A and 4D. The central hub 12 includes the base portion 18 having a first surface 38 disposed at a first end 40 of the base portion 18 and a second surface 42 disposed at a second end 44 of the base portion 18. The base portion 18 may have a disk-like or a generally cylindrical shape and may have a circular (or substantially circular) cross-sectional shape when viewed along the hub axis 32. The first surface 38 and the second surface 42 may each be planar or substantially planar, or may have any other shape or combination of shapes.

As illustrated in FIG. 4B, the aperture 16 may extend through the base portion 18. In particular, as illustrated in the cross-sectional view of FIG. 5A, a first end 46 of the aperture 16 may be disposed at the first surface 38 of the base portion 18 and a second end 48 of the aperture 16 may be disposed at the second surface 42 of the base portion 18. The aperture 16 may have any suitable shape or combination of shapes that are configured to receive one or more portions or segments of suture. For example, the aperture 16 may have a "FIG. 8" shape when viewed along the hub axis 32. Further, the aperture 16 may not have a uniform cross sectional shape from the first end 46 to the second end 48 along an axis parallel to or along the hub axis 32. In some embodiments, the aperture 16 expands or diverges from the second end 48 to the first end 46.

As illustrated in FIG. 4A, the central hub 12 may include the first arm 50 that may extend along a first arm axis 52 from a first end 54 to a second end 56. The first arm axis 52 may extend parallel to or along the hub axis 32. The first end 54 of the first arm 50 may be coupled to a portion of the base portion 18, such as a portion of the second surface 42 of the base portion 18. The second end 56 of the first arm 50 may be disposed at or adjacent to the second end 36 of the central hub 12. The first arm 50 may have any suitable cross-sectional shape along the first arm axis 52, such as a rectangular shape or a substantially rectangular shape. As such, the first arm 50 may be cantilevered from the portion of the second surface 42 of the base portion 18 such that when a force is applied at or adjacent to the second end 56 of the first arm 50, and the force is directed normal to the first arm axis 52 (i.e., along the Y-axis of the reference coordinate system provided in FIGS. 4A and 4D), the second end 56 of the first arm 50 may deflect in a directed along the Y-axis relative to the fixed first end 54 of the first arm 50.

Still referring to FIG. 4A, a first arm mating feature 58 may be disposed at or adjacent to the second end 56 of the first arm 50. However, the first arm mating feature 58 may be disposed offset from the second end 56 of the first arm 50, and may be disposed at any suitable location between the first end 54 and the second end 56. The first arm mating feature 58 may be any feature or combination of features that is configured to engage with a first collar mating feature 60 of the locking collar 14 (see, e.g., FIG. 2C) that will be described in more detail in a following section. For example, the first arm mating feature 58 may be a slot that extends along an outward facing surface 62 of the first arm 50, and the slot may extend in a direction normal to both the first arm axis 52 and the Y-axis of the reference coordinate system provided in FIGS. 4A and 4D (i.e., along the X-axis of the reference coordinate system provided in FIGS. 4A and 4D). The slot may have one or more undercut features that is configured to engage a corresponding ridge feature on the first collar mating feature 60 of the locking collar 14, and the undercut feature may allow first arm portion 50 to displace in a first direction relative to the locking collar 14 but prevent the first arm portion 50 from translating in a second direction relative to the locking collar 14.

Still referring to FIG. 4A, the central hub 12 may include the second arm 62 that may be a mirror image of, but otherwise identical to, the first arm 50, and the plane of symmetry may be a plane parallel to the X-Z plane (of the reference coordinate system provided in FIGS. 4A and 4D) that that passes through the hub axis 32. In particular, the second arm 62 that may extend along a second arm axis 64 from a first end 66 to a second end 68, and the second arm axis 64 may extend parallel to or along the hub axis 32 and may be parallel to the first arm axis 52. The first end 66 of the second arm 62 may be coupled to a portion of the base portion 18, such as a portion of the second surface 42 of the base portion 18. The second end 68 of the second arm 62 may be disposed at or adjacent to the second end 36 of the central hub 12. The second arm 62 may have any suitable cross-sectional shape along the second arm axis 64, such as a rectangular shape or a substantially rectangular shape. As such, the second arm 62 may be cantilevered from the portion of the second surface 42 of the base portion 18 such that when a force is applied at or adjacent to the second end 68 of the second arm 62, and the force is directed normal to the second arm axis 64 (i.e., along the Y-axis of the reference coordinate system provided in FIGS. 4A and 4D), the second end 68 of the second arm 62 may deflect in a directed along the Y-axis relative to the fixed first end 66 of the second arm 62.

A second arm mating feature 70 may be disposed at or adjacent to the second end 68 of the second arm 62. However, the second arm mating feature 70 may be disposed offset from the second end 68 of the second arm 62, and may be disposed at any suitable location between the first end 66 and the second end 68. The second arm mating feature 70 may be any feature or combination of features that is configured to engage with a second collar mating feature 72 of the locking collar 14 (see, e.g., FIG. 2C) that will be described in more detail in a following section. For example, the second arm mating feature 70 may be a slot that extends along an outward facing surface 62 of the second arm 62, and the slot may extend in a direction normal to both the second arm axis 64 and the Y-axis of the reference coordinate system provided in FIGS. 4A and 4D (i.e., along the X-axis of the reference coordinate system provided in FIGS. 4A and 4D). The slot may have one or more undercut features that is configured to engage a corresponding ridge feature on the second collar mating feature 72 of the locking collar 14, and the undercut feature may allow first arm portion 50 to displace in a first direction relative to the locking collar 14 but prevent the first arm portion 50 from translating in a second direction relative to the locking collar 14.

As illustrated in FIG. 4A, the central hub 12 may include the base securing ramp 20 that extends from the first end 24 to a second end 74 along a ramp base axis 73, which may be parallel (or substantially parallel) to the hub axis 32. The first end 24 of the securing ramp 20 may be disposed at or adjacent to the second end 44 of the base portion 18, and the first end 24 of the securing ramp 20 may extend from the second surface 42 of the base portion 18 towards the second end 36 of the central hub 12. In some embodiments, a portion of the first end 24 of the securing ramp 20 may be disposed at or adjacent to the second end 48 of the aperture 16. The second end 74 of the securing ramp 20 may be disposed offset from the second end 56 of the first arm 50 and may be disposed between the first end 54 and the second end 56 (i.e., approximately halfway between the first end 54 and the second end 56) of the first arm 50. Similarly, the second end 74 of the securing ramp 20 may be disposed offset from the second end 68 of the second arm 62 and may be disposed between the first end 66 and the second end 68 (i.e., approximately halfway between the first end 66 and the second end 68) of the second arm 62.

The securing ramp 20 may extend laterally (i.e., in a direction substantially along the X-axis of the reference coordinate system provided in FIGS. 4A and 4D) between the first arm 50 and the second arm 62. That is, a first lateral end 75 of the base securing ramp 20 may be disposed at or adjacent to an inner surface 76 of the first arm 50, and a second lateral end 78 of the securing ramp 20 may be disposed at or adjacent to an inner surface 80 of the second arm 62.

Figure 5A:
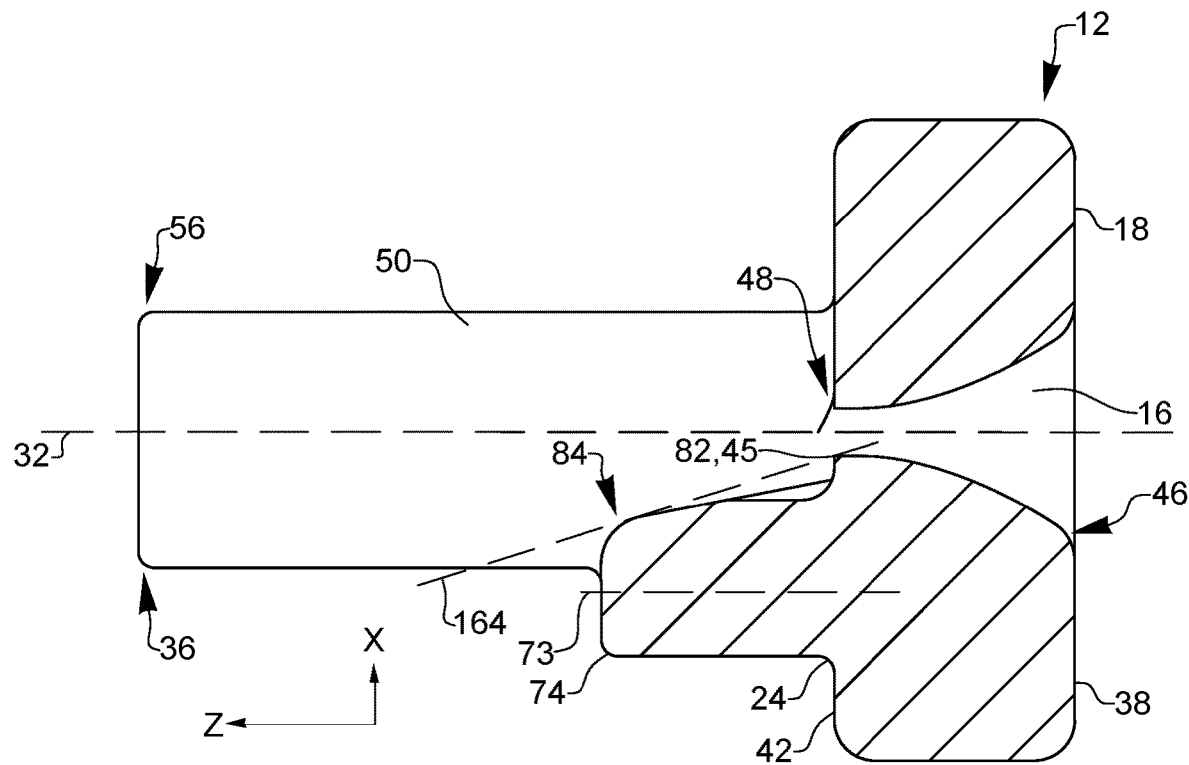
FIG. 5A is a cross-sectional view of the embodiment of the central hub of FIG. 4A taken along section line 5A-5A.
Figure 5B:
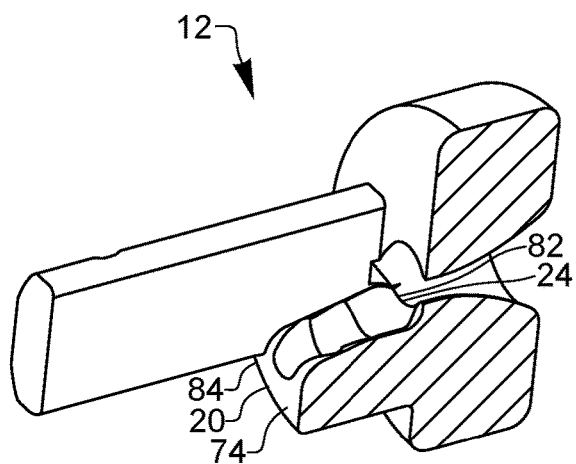
FIG. 5B is a perspective view of the cross-sectional view of the embodiment of the central hub of FIG. 5A.

As illustrated in FIG. 4A, the base securing ramp 20 may include the base securing surface 22 that extends along a portion of the base securing ramp 20 along or substantially along the base ramp axis 73 (see FIG. 5A) from a first end 82 to a second end 84. The base securing surface 22 may extend along any portion or portions of the base securing ramp 20 that will allow all or a portion of the base securing surface 22 to engage a segment of suture 30 when the central hub 12 is secured to the locking collar 14 in the manner that will be described in more detail in a following section. In some embodiments, the first end 82 of the base securing surface 22 may be disposed at or adjacent to the first end 24 of the base securing ramp 20 and the second end 84 of the base securing surface 22 may be disposed at or adjacent to the second end 74 of the base securing ramp 20. However, the first end 82 of the base securing surface 22 may be offset from the first end 24 of the base securing ramp 20 and/or the second end 84 of the base securing surface 22 may be offset from the second end 74 of the base securing ramp 20. In some embodiments, the first end 82 of the base securing surface 22 may be disposed at or adjacent to the second surface 42 of the base portion 18, and the first end 82 of the base securing surface 22 may be adjacent to the second end 48 of the aperture 16 (as illustrated in FIG. 5A). With reference to FIG. 5F, the base securing surface 22 may extend laterally to the first lateral end 75 of the securing ramp 20 and may extend laterally to the second lateral end 78 of the securing ramp 20. However, the base securing surface 22 may not fully extend to the first lateral end 75 of the securing ramp 20 and/or may not fully extend to the second lateral end 78 of the securing ramp 20.

Figure 5C:
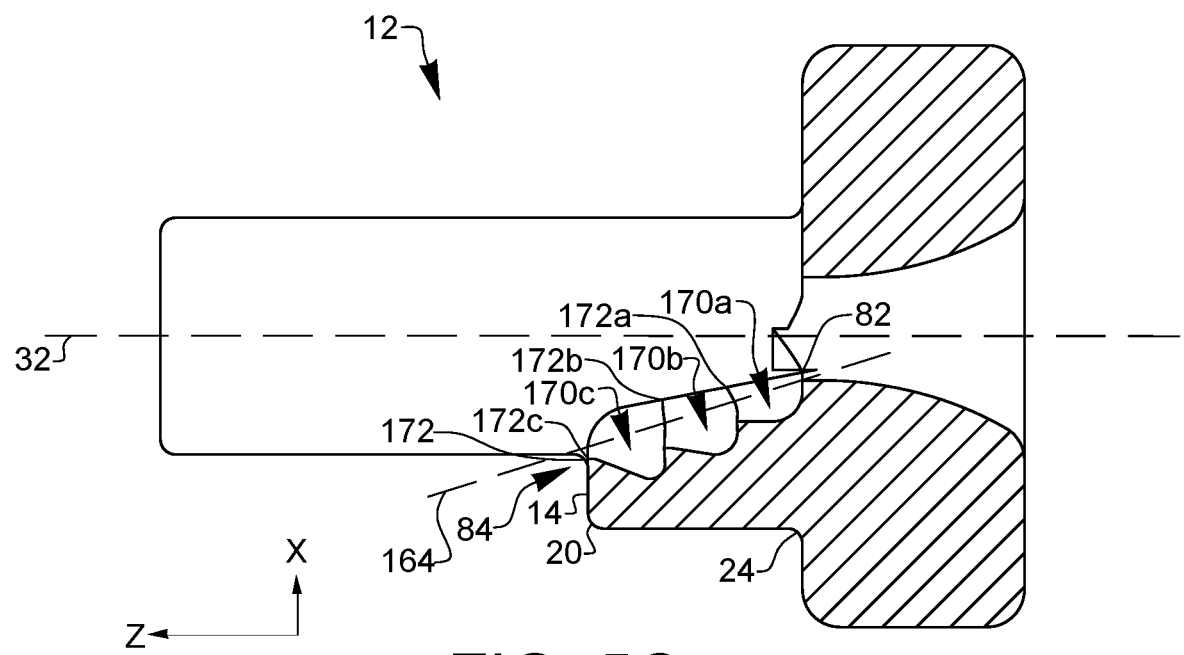
FIG. 5C is a cross-sectional view of the embodiment of the central hub of FIG. 4A taken along section line 5C-5C.
Figure 5D:
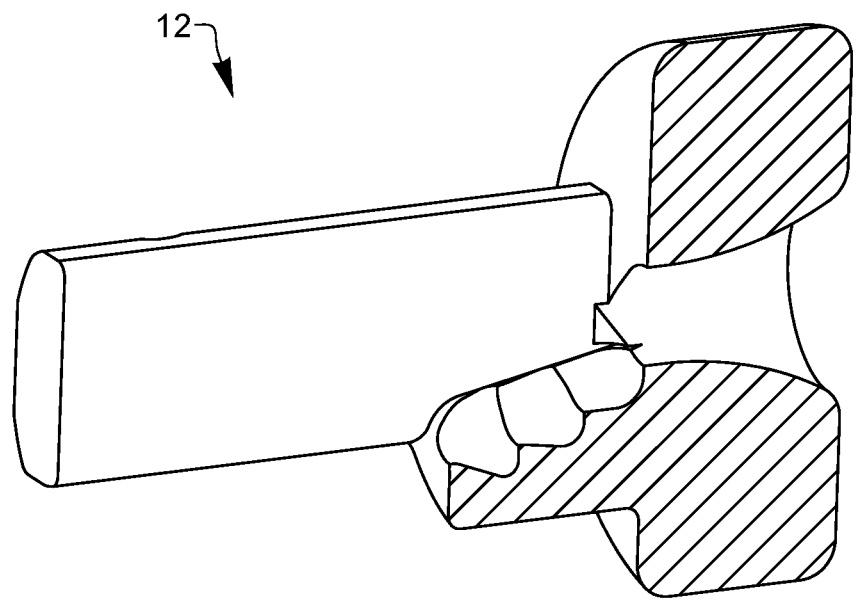
FIG. 5D is a perspective view of the cross-sectional view of the embodiment of the central hub of FIG. 5C.
Figure 5E:
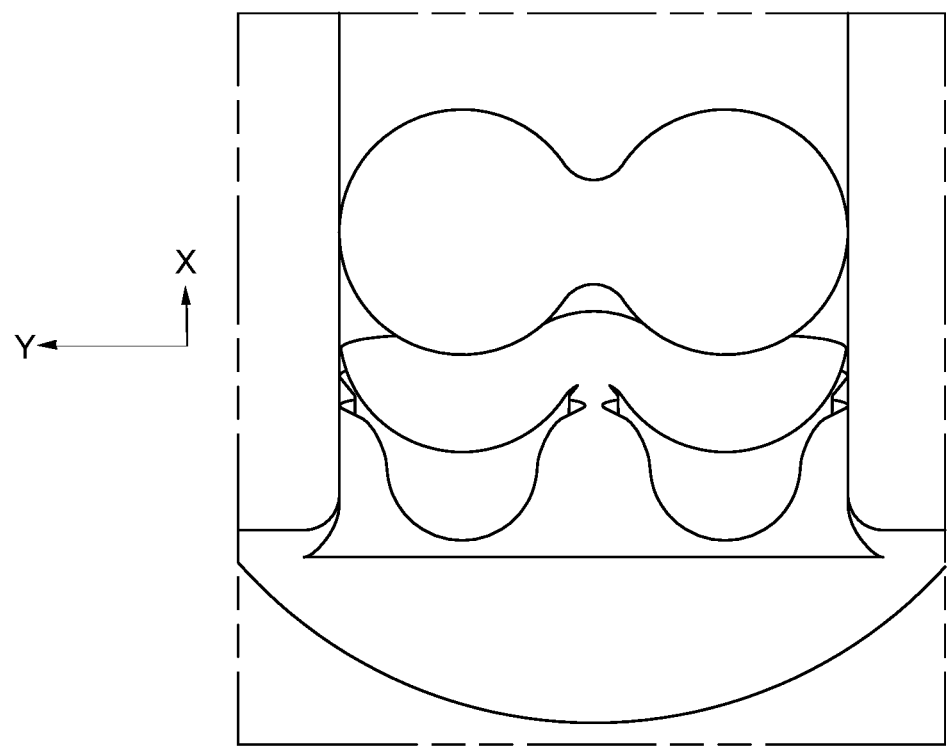
FIGS. 5E and 5F are views of the base securing ramp of the embodiment of the central hub of FIG. 5A.
Figure 5F:
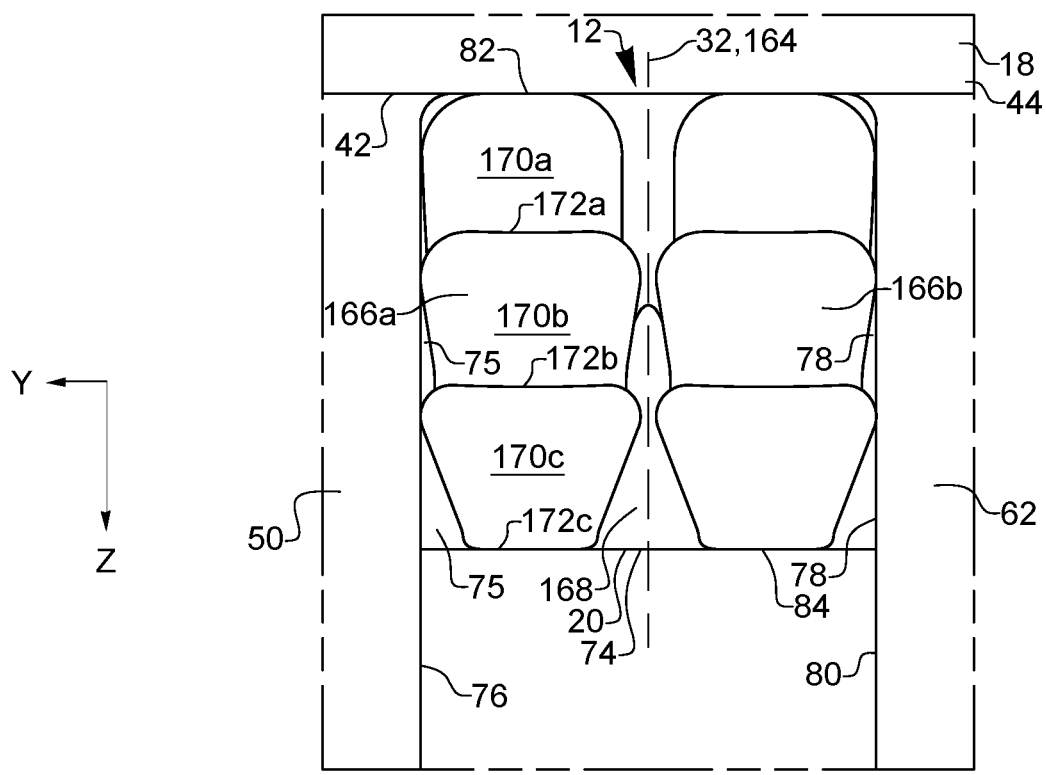
Figure 5G:
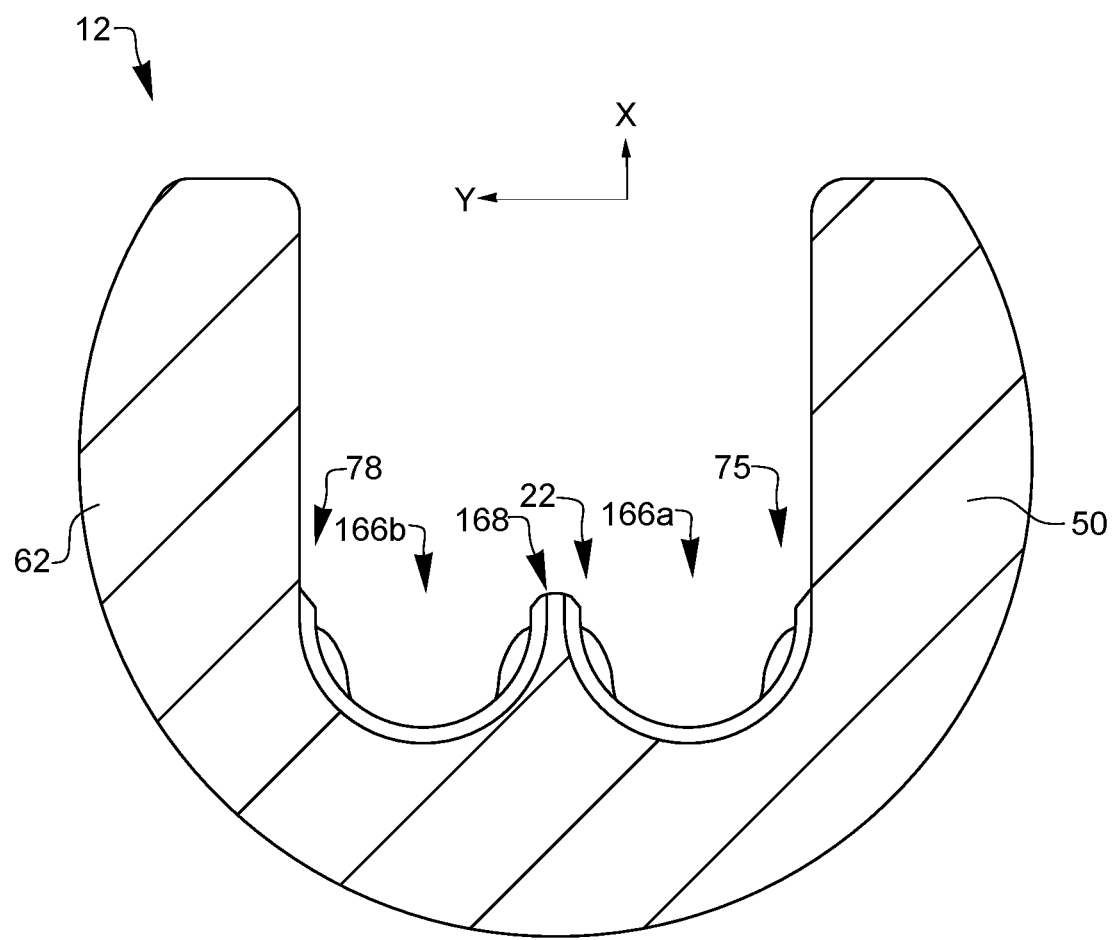
FIG. 5G is a cross-sectional view of the embodiment of the central hub of FIG. 4A taken along section line 5G-5G of FIG. 4C.

When viewed in cross-section in a direction along the Y-axis of the reference coordinate system of FIGS. 5A and 5C (with the cross-section plane being parallel to the X-Z plane and extending through the hub axis 32 in FIG. 5A and offset from the hub axis 32 in FIG. 5C), the base securing surface 22 may extend from the first end 82 to the second end 84 along an axis 164 that forms an acute angle with the hub axis 32, and the acute angle may be between 5° and 30°, for example. The axis 164 may be linear and may generally extends through or along the base securing surface 22 in a general direction from the first end 82 to the second end 84 in a manner that generally conforms to the orientation of the base securing surface 22 relative to the hub axis. For example, with reference to FIG. 5A, the axis 164 may intersect a first portion at or adjacent to the first end 82 and a second portion at or adjacent to the second end 84.

The base securing surface 22 may have any suitable texture, combination of textures, or other surface treatment that facilitates the engagement of the segment of suture 30 when the central hub 12 is coupled to the locking collar 14. For example, the base securing surface 22 may include a plurality of ridges, bumps, protrusions, steps, or nubs, for example, or a combination of any or all of these features.

In some embodiments, the base securing surface 22 may have the general configuration of a "hog's mouth." More specifically, as shown in FIG. 5F, the base securing surface 22 may include a first trough 166a that extends on a first lateral side of the hub axis 32 (or the axis 164) from the first end 82 to the second end 84 of the base securing surface 22. In addition, as illustrated in FIG. 5F, the base securing surface 22 may include a second trough 166b that extends on a second lateral side of the hub axis 32 from the first end 82 to the second end 84 of the base securing surface 22, and the first trough 166a may be separated from the second trough 166b by a ridge 168 that may extend from the first end 82 to the second end 84 of the base securing surface 22 generally along the hub axis 32 (or the axis 164). With reference to FIGS. 4A, 5F and the first trough 166a may extend laterally (i.e., along the Y-axis of the reference coordinate system of FIG. 5F) from a first end at or adjacent to first lateral end 75 of the securing ramp 20 to a second end at or adjacent to a first portion of the ridge 168, and the cross-sectional shape may be substantially similar to an arc or a segment of a circle. Similarly, the second trough 166b may extend laterally (i.e., along the Y-axis of the reference coordinate system of FIG. 5F) from a first end at or adjacent to a second portion of the ridge 168 to a second end at or adjacent to the second lateral end 78 of the securing ramp 20, and the cross-sectional shape may be identical or substantially identical to the cross-sectional shape of the first trough 166a.

When the first trough 166a is viewed along the Y-axis in cross-section taken along a sectional plane parallel to the X-Z plane of the reference coordinate system, (i.e., the view of FIG. 5C which is taken along section line 5C-5C of FIG. 4A), the first trough 166a has a series of "steps" or shelfs 170a, 17b, 170c that extend from the first end 82 to the second end 84 of the base securing surface 22. Each shelf 170a, 17b, 170c includes an edge ridge 172a, 172b, 172c that is configured to dig into or engage the segment of suture 30 when the locking collar 14 is secured to the central hub 12 to prevent the segment of suture 30 from displacing relative to the locking collar 14 and/or the central hub 12 when the locking collar 14 is secured to the central hub 12. In some embodiments, additional, or fewer, shelves may be included in the first trough 166a. The second trough 166b may be identical to (or substantially identical to) the first trough 166a, but the second troughs 166b may have any number or configuration of shelves. In addition, the base securing surface 22 may only include a single trough, or may include three or more troughs, and each trough may have any suitable configuration or combination of configurations.

In some embodiments, the base securing surface 22 may have the general configuration of a plurality of stairs (not shown) that are similar to the shelves 170a, 17b, 170c. However, in this configuration, the base securing surface 22 may not have a first trough 166a and second trough 166b, but may instead include a single plurality of stairs (not shown) that may extend along the base securing surface 22 may extend from the first end 82 to the second end 84 along the axis 164. In some embodiments, the base securing surface 22 may include three to eight stairs. In some embodiments, the collar securing surface 28 may also have a corresponding plurality of stairs that are similar (or identical) to the stairs on the base securing surface 22, and the plurality of stairs of the base securing surface 22 may be oriented such that the plurality of stairs may be interlock or substantially interlock or intermesh with the plurality of stairs of the collar securing surface 28 when the central hub 12 is secured to the locking collar 14. However, in some configurations, the plurality of stairs of the base securing surface 22 may be oriented to not interlock or intermesh with the plurality of stairs of the collar securing surface 28 when the central hub 12 is secured to the locking collar 14.

Figure 1A:
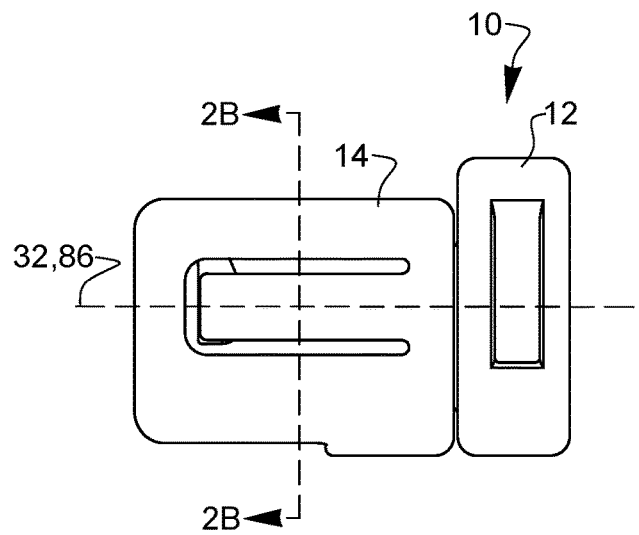
FIGS. 1A to 1E are various views of an embodiment of a suture fastening assembly.
Figure 1B:
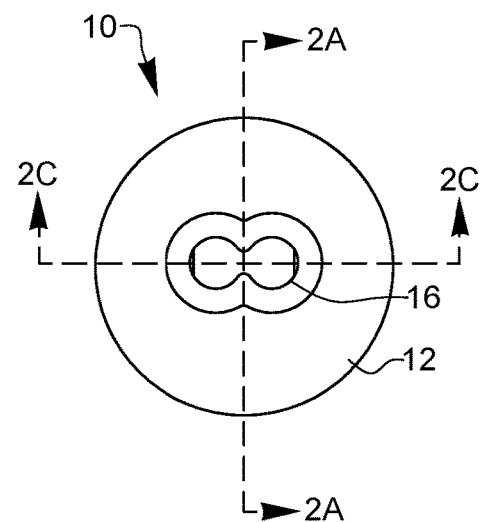
Figure 1C:
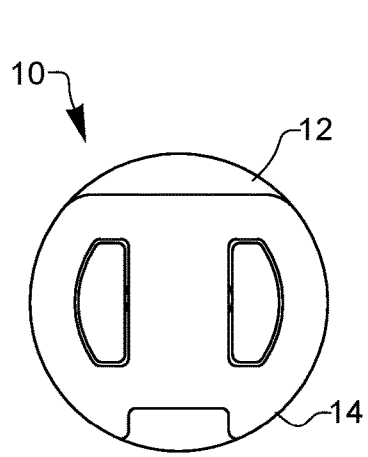
Figure 1D:
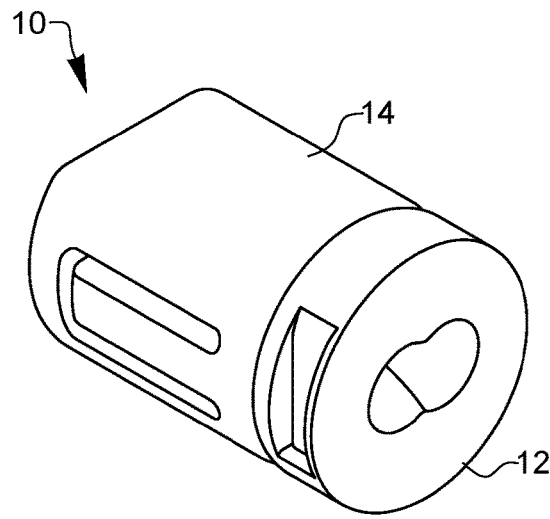
Figure 1E:
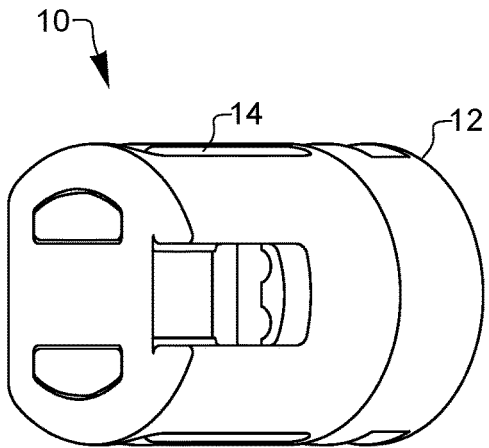
Figure 6A:
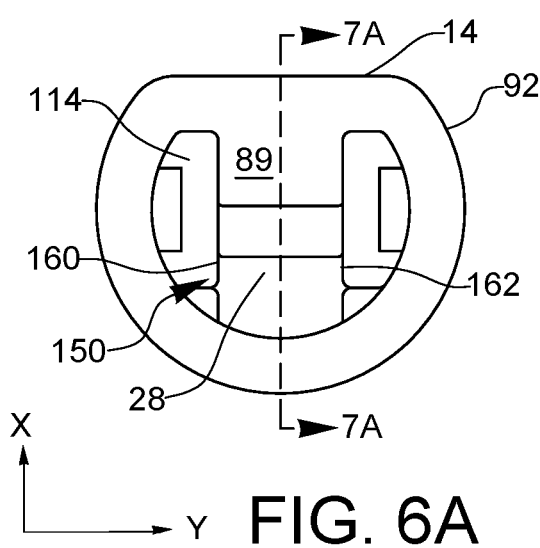
FIGS. 6A to 6H are various views of an embodiment of a locking collar of the suture fastening assembly.

Turning to FIG. 1A, the surgical fastening assembly 10 may also include the locking collar 14 secured to the central hub 12. As illustrated in FIG. 6A, the locking collar 14 may extend along a locking collar axis 86 from a first end 88 to a second end 90, and the locking collar axis 86 may be parallel to or aligned with the Z-axis of the reference coordinate system provided in FIG. 6B. In some embodiments, the first end 88 of the locking collar 14 may be disposed at or adjacent to the second surface 42 (or the second end 44) of the base portion 18 when assembled with the central hub 12, as illustrated in FIG. 2A. In addition, the second end 88 of the locking collar 14 may be disposed at or adjacent to the second end 36 of the central hub 12.

Figure 2C:
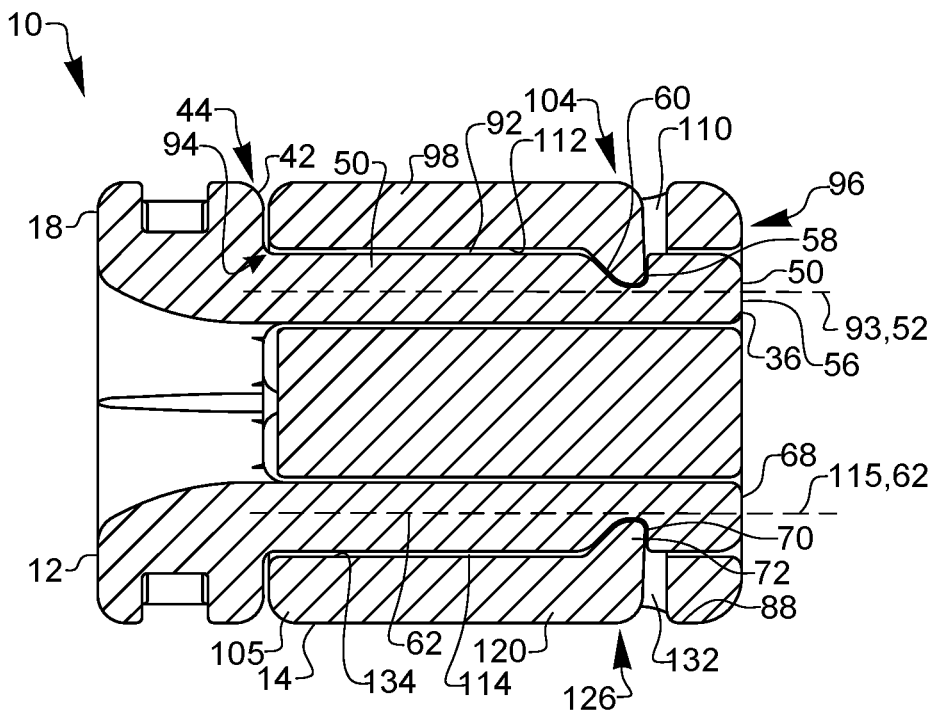
FIG. 2C is a cross-sectional view of the embodiment of the suture fastening assembly of FIG. 1B taken along section line 2C-2C.
Figure 2D:
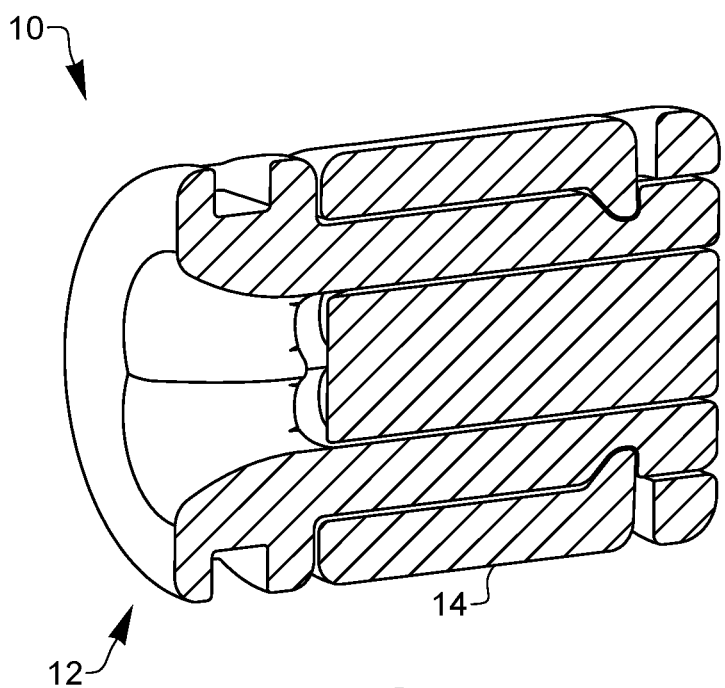
FIG. 2D is a perspective view of the cross-sectional view of the embodiment of the suture fastening assembly of FIG. 2C.

With reference to FIG. 6A, the locking collar 14 may include a first slot 92 adapted to receive at least a portion of the first arm 50 of the central hub 12. As shown in FIG. 2C, the first slot 92 may extend through an upper surface 89 of the locking collar 14 and extend along a first slot axis 93 from a first end 94 to a second end 96, and the first slot axis 93 may be parallel to the locking collar axis 86 and may be parallel to (or colinear or aligned with) to the first arm axis 52 when the first arm 50 is disposed in the first slot 92. When the first arm 50 is disposed within the first slot 92, the first end 54 of the first arm 50 is at or adjacent to the first end 88 of the locking collar 14 and the second end 56 of the first arm 50 is at or adjacent to the second end 90 of the locking collar 14. In some embodiments, the second end 56 of the first arm 50 may be disposed between the first end 88 and the second end 90 of the locking collar 14 such that the second end 56 of the first arm 50 is offset from the second end 90 of the locking collar 14.

The first slot 92 may be defined by two or more surfaces that may be planar or substantially planar and may extend along or generally along (or parallel to) the locking collar axis 86, and the two or more surfaces may cooperate to define a cross-sectional shape (normal to the locking collar axis 86) that may correspond or substantially correspond to the cross-sectional shape (normal to the first arm axis 52) of the first arm 50 of the central hub 12. For example, the cross-sectional shape (normal to the locking collar axis 86) of the first slot 92 may be substantially rectangular and the cross-sectional shape (normal to the first arm axis 52) of the first arm 50 of the central hub 12 may be substantially rectangular, and the dimensions of the first slot 92 may be slightly longer than the dimensions of the first arm 50 of the central hub 12 such that the first arm 50 of the central hub 12 is insertable into, and fits snugly within, the first slot 92.

Figure 6B:
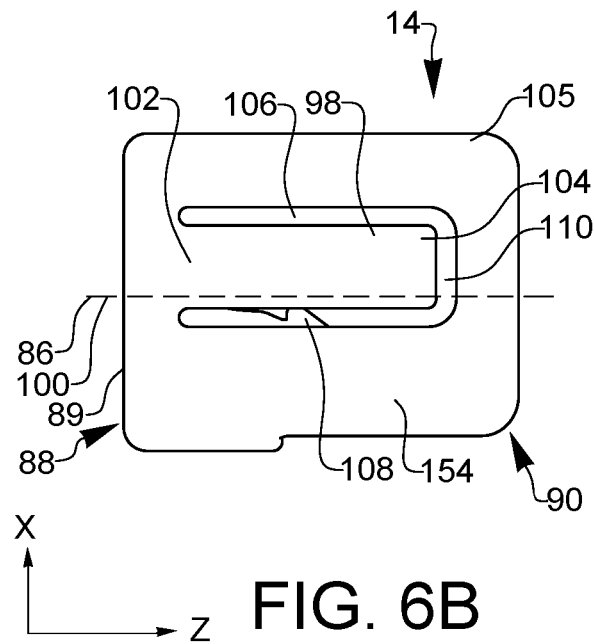
Figure 6C:
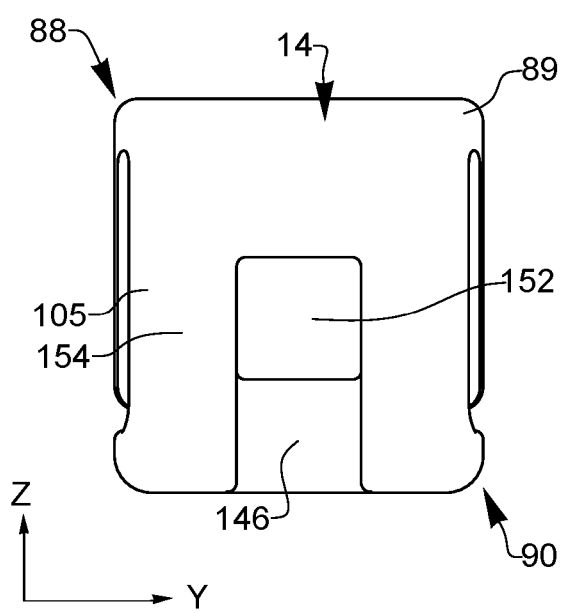
Figure 6D:
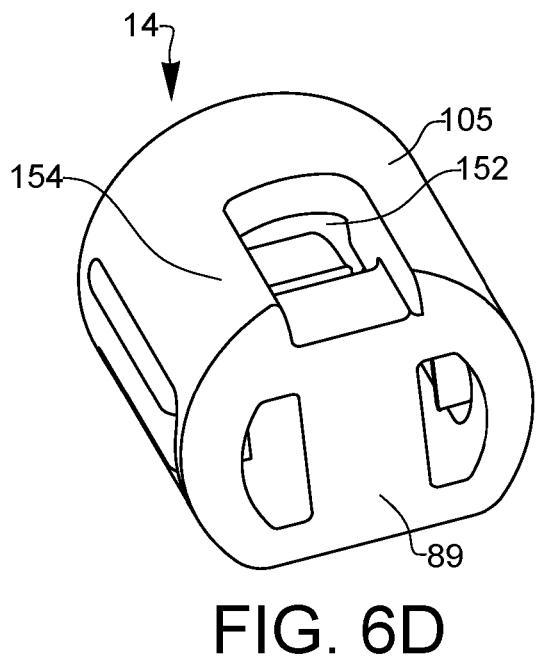
Figure 6E:
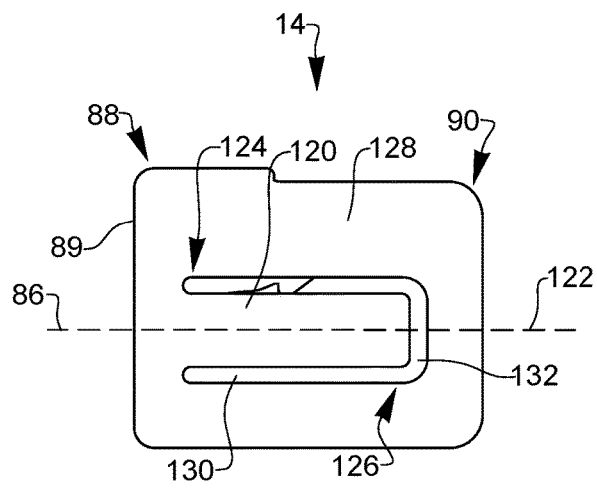
Figure 6F:
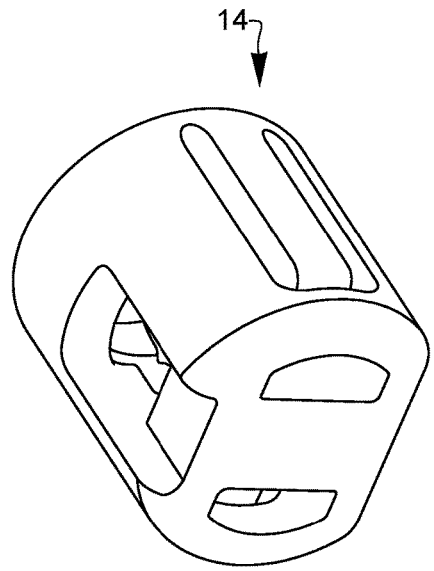
Figure 6G:
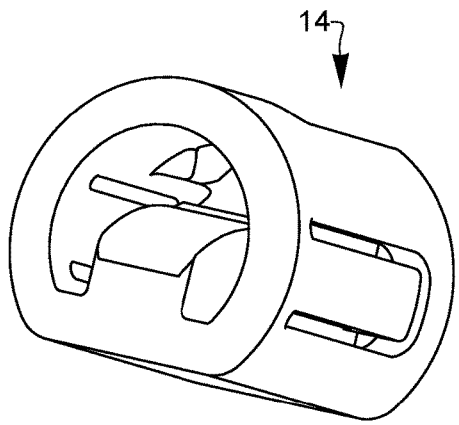

As illustrated in FIG. 6B, one or more of the surfaces that define the first slot 92 may also at least partially define a first collar arm 98 of the locking collar 14. The first collar arm 98 may extend along a first collar arm axis 100 from a first end 102 to a second end 104, and the first collar arm axis 100 may extend parallel to or along the locking collar axis 86. The first collar arm 98 may be defined within or along a body portion 105 of the locking collar 14 by one or more slot segments extending through or along the body portion 105, such as a first longitudinal slot 106, a second longitudinal slot 108, and a transverse slot 110. The first end 102 of the first collar arm 98 may be coupled to a portion of the body portion 105, such as a portion of the body portion 105 that is offset from the first end 88 of the locking collar 14. The second end 104 of the first collar arm 98 may be disposed at or adjacent to the second end 96 of the locking collar 14.

The first collar arm 98 may have any suitable cross-sectional shape along the first collar arm axis 100, such as a rectangular shape or a substantially rectangular shape. As such, the first collar arm 98 may be cantilevered from the portion of the body portion 105 of the locking collar 14 such that when a force is applied at or adjacent to the second end 104 of the first collar arm 98, and the force is directed normal to the first collar arm 98 (i.e., along the Y-axis of the reference coordinate system provided in FIGS. 6A and 6B), the second end 104 of the first collar arm 98 may deflect in a directed along the Y-axis relative to the fixed first end 102 of the first collar arm 98.

Referring now to FIG. 2C, the first collar mating feature 60 of the locking collar 14 may be disposed on the first collar arm 98 in any suitable position to allow for engagement with the first arm mating feature 58 when the first arm 50 is fully inserted into the first slot 92 of the locking collar 14. Thus, in some embodiments, the first collar mating feature 60 may be disposed at or adjacent to the second end 104 of the first collar arm 98. However, the first collar mating feature 60 may be disposed offset from the second end 104 of the first collar arm 98, and may be disposed at any suitable location between the first end 102 and the second end 104.

The first collar mating feature 60 may be any feature or combination of features that is configured to engage with first arm mating feature 58 of the first arm 50 of the central hub 12 (see, e.g., FIG. 2C). For example, the first collar mating feature 60 may be a projection or ridge feature that extends along an inward facing surface 112 of the first collar arm 98, and the slot may extend in a direction normal to both the first collar arm axis 100 and the Z-axis of the reference coordinate system provided in FIG. 6B (i.e., along the X-axis of the reference coordinate system provided in FIG. 6B). The projection or ridge feature of the first collar mating feature 60 may be configured to be at least partially received into the slot of the first arm mating feature 58, and the projection or ridge feature may be configured to be received into the slot when the first arm 50 of the central hub 12 is fully inserted into the first slot 92 of the locking collar 14 (in a first direction relative to the locking collar 14), and the engagement may prevent the first arm portion 50 from being displaced out of (i.e., in a second direction relative to) the locking collar 14.

With reference to FIG. 6A, the locking collar 14 may include a second slot 114 adapted to receive at least a portion of the second arm 62 of the central hub 12. The second slot 114 may be a mirror image of, but otherwise identical to, the first slot 92, and the plane of symmetry may be a plane parallel to the X-Z plane (of the reference coordinate system provided in FIGS. 6A and 6B) that that passes through the locking collar axis 86. As shown in FIG. 2C, the second slot 114 may extend through the upper surface 89 of the locking collar 14 and extend along a second slot axis 115 from a first end 116 to a second end 118, and the second slot axis 115 may be parallel to the locking collar axis 86 and may be parallel to (or colinear or aligned with) to the second arm axis 64 when the second arm 62 is disposed in the second slot 114. When the second arm 62 is disposed within the second slot 114, the first end 66 of the second arm 62 is at or adjacent to the first end 88 of the locking collar 14 and the second end 68 of the second arm 62 is at or adjacent to the second end 90 of the locking collar 14. In some embodiments, the second end 68 of the second arm 62 may be disposed between the first end 88 and the second end 90 of the locking collar 14 such that the second end 68 of the second arm 62 is offset from the second end 90 of the locking collar 14.

The second slot 114 may be defined by two or more surfaces that may be planar or substantially planar and may extend along or generally along (or parallel to) the locking collar axis 86, and the two or more surfaces may cooperate to define a cross-sectional shape (normal to the locking collar axis 86) that may correspond or substantially correspond to the cross-sectional shape (normal to the second arm axis 64) of the second arm 62 of the central hub 12. For example, the cross-sectional shape (normal to the locking collar axis 86) of the second slot 114 may be substantially rectangular and the cross-sectional shape (normal to the second arm axis 64) of the second arm 62 of the central hub 12 may be substantially rectangular, and the dimensions of the second slot 114 may be slightly longer than the dimensions of the second arm 62 of the central hub 12 such that the second arm 62 of the central hub 12 is insertable into, and fits snugly within, the second slot 114.

As illustrated in FIG. 6B, one or more of the surfaces that define the second slot 114 may also at least partially define a second collar arm 120 of the locking collar 14. The second collar arm 120 may extend along a second collar axis 122 from a first end 124 to a second end 126, and the second collar axis 122 may extend parallel to or along the locking collar axis 86. The second collar arm 120 may be defined within or along the body portion 105 of the locking collar 14 by one or more slot segments extending through or along the body portion 105, such as a first longitudinal slot 128, a second longitudinal slot 130, and a transverse slot 132. The first end 124 of the second collar arm 120 may be coupled to a portion of the body portion 105, such as a portion of the body portion 105 that is offset from the first end 88 of the locking collar 14. The second end 126 of the second collar arm 120 may be disposed at or adjacent to the second end 118 of the locking collar 14.

The second collar arm 120 may have any suitable cross-sectional shape along the second collar axis 122, such as a rectangular shape or a substantially rectangular shape. As such, the second collar arm 120 may be cantilevered from the portion of the body portion 105 of the locking collar 14 such that when a force is applied at or adjacent to the second end 126 of the second collar arm 120, and the force is directed normal to the second collar arm 120 (i.e., along the Y-axis of the reference coordinate system provided in FIGS. 6A and 6B), the second end 126 of the second collar arm 120 may deflect in a directed along the Y-axis relative to the fixed first end 124 of the second collar arm 120.

Referring now to FIG. 2C, the second collar mating feature 72 of the locking collar 14 may be disposed on the second collar arm 120 in any suitable position to allow for engagement with the second arm mating feature 70 when the second arm 62 is fully inserted into the second slot 114 of the locking collar 14. Thus, in some embodiments, the second collar mating feature 72 may be disposed at or adjacent to the second end 126 of the second collar arm 120. However, the second collar mating feature 72 may be disposed offset from the second end 126 of the second collar arm 120, and may be disposed at any suitable location between the first end 124 and the second end 126.

The second collar mating feature 72 may be any feature or combination of features that is configured to engage with second arm mating feature 70 of the second arm 62 of the central hub 12 (see, e.g., FIG. 2C). For example, the second collar mating feature 72 may be a projection or ridge feature that extends along an inward facing surface 134 of the second collar arm 120, and the slot may extend in a direction normal to both the second collar axis 122 and the Z-axis of the reference coordinate system provided in FIG. 6B (i.e., along the X-axis of the reference coordinate system provided in FIG. 6B). The projection or ridge feature of the second collar mating feature 72 may be configured to be at least partially received into the slot of the second arm mating feature 70, and the projection or ridge feature may be configured to be received into the slot when the second arm 62 of the central hub 12 is fully inserted into the second slot 114 of the locking collar 14 (in a first direction relative to the locking collar 14), and the engagement may prevent the first arm portion 50 from being displaced out of (i.e., in a second direction relative to) the locking collar 14.

As illustrated in FIG. 4A, the locking collar 14 may include the collar securing ramp 26 that extends from a first end 144 to a second end 146 along a ramp collar axis 148, which may include two or more segments, and one or more of the segments may be non-linear, and may have the shape of an arc, for example. The first end 144 of the collar securing ramp 26 may be disposed at or adjacent to the upper surface 89 of the locking collar 14 and/or the first end 88 of the locking collar 14. The first end 144 of the collar securing ramp 26 may also be disposed at or adjacent to a portion of an upper aperture 150 formed in the upper surface 89 of the locking collar 14, and the upper aperture 150 may be in communication with a portion of the first slot 92 and the second slot 114. The second end 146 of the collar securing ramp 26 may be disposed at or adjacent to second end 90 of the locking collar 14 or longitudinally offset (i.e., offset along the Z-axis of the reference coordinate system of FIG. 7A) from the second end 90 of the locking collar 14. The second end 146 of the collar securing ramp 26 may also be disposed at or adjacent to a lateral aperture 152 formed in a circumferential outer surface 154 of the body portion 105 of the second end 90 of the locking collar 14.

The collar securing ramp 26 may include the collar securing surface 28 that may extend along all or a part of the collar securing ramp 26, and the collar securing surface 28 may extend from a first end 156 to a second end 158. The collar securing surface 28 may extend along any portion or portions of the collar securing ramp 26 that will allow all or a portion of the collar securing surface 28 to engage a segment of suture 30 when the central hub 12 is secured to the locking collar 14. In some embodiments, the first end 156 of the collar securing surface 28 may be at or adjacent to the first end 144 of the collar securing ramp 26 and the second end 158 of the collar securing surface 28 may be disposed at an intermediate point between the first end 144 and the second end 146 of the collar securing ramp 26. However, the first end 156 of the collar securing surface 28 may be offset from the first end 156 of the collar securing ramp 26 and/or the second end 158 of the collar securing surface 28 may be disposed at or adjacent to the second end 146 of the collar securing ramp 26.

Figure 7A:
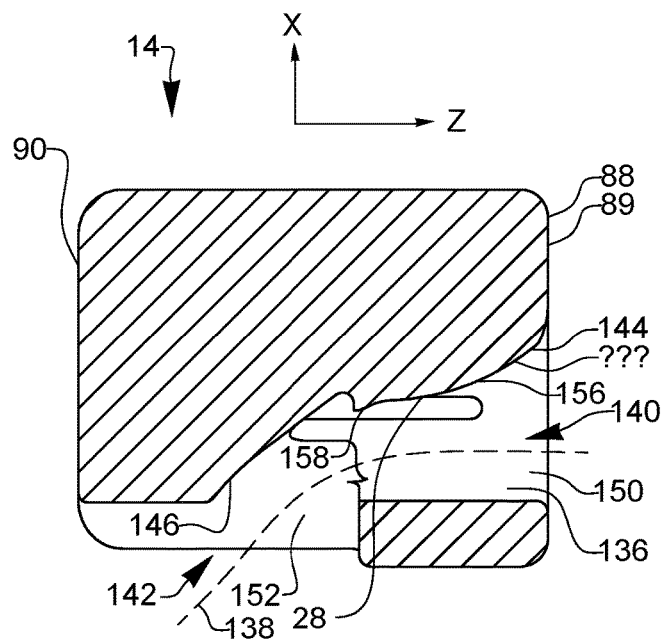
FIG. 7A is a cross-sectional view of the embodiment of the locking collar of FIG. 6B taken along section line 7A-7A.
Figure 7B:
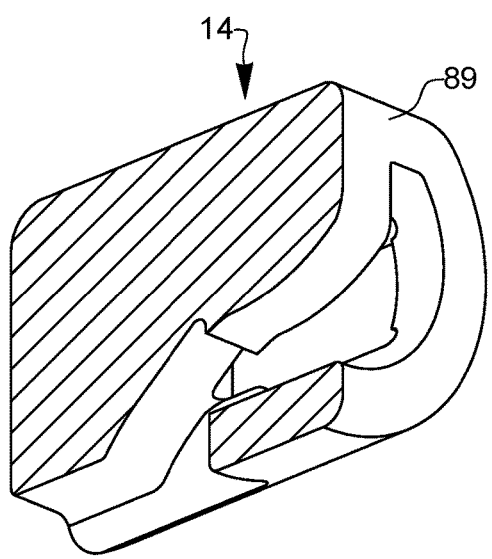
FIGS. 7B to 7D are perspective views of the cross-sectional view of the embodiment of the locking collar of FIG. 7A.

When viewed in cross-section along the Y-axis of the reference coordinate system of FIG. 7A (with the cross-section plane being parallel to the X-Z plane and extending through the locking collar axis 86), the collar securing surface 28 may extend from the first end 156 to a second end 158 along a curved profile having the shape of a segment of an arc. The cross-section shape may be uniform across (i.e., along the Y-axis) from the first lateral end 160 of the collar securing ramp 26 to the second lateral end 162 of the collar securing ramp 26. However, the cross-sectional shape of the collar securing surface 28 may change along the Y-axis between the first lateral end 160 of the collar securing ramp 26 to the second lateral end 162 of the collar securing ramp 26, thus forming one or more complex surfaces along all or part of the collar securing surface 28.

The collar securing surface 28 may have any suitable texture, combination of textures, or other surface treatment that facilitates the engagement of the segment of suture 30 when the central hub 12 is coupled to the locking collar 14. For example, the collar securing surface 28 may include a plurality of ridges, bumps, protrusions, steps, or nubs, for example, or a combination of any or all of these features. In some embodiments, the collar securing surface 28 may have the same or identical surface features or treatments as the base securing surface 22 of the central hub 12. However, in some embodiments, all or a portion of the collar securing surface 28 may not have a surface treatment or surface features, and may be smooth or substantially smooth.

Figure 6H:
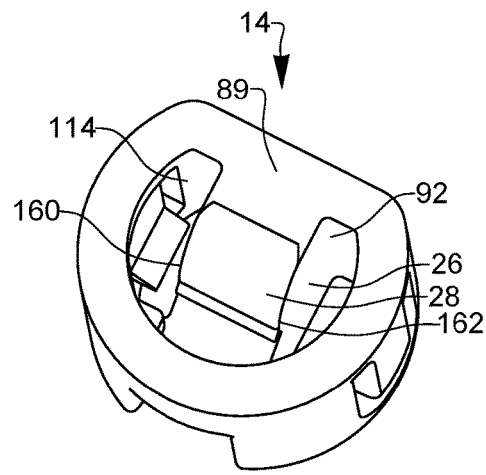

As illustrated in FIGS. 6A and 6H, the collar securing surface 28 may extend laterally to a first lateral end 160 of the collar securing ramp 26 and may extend laterally to a second lateral end 162 of the collar securing ramp 28. However, the collar securing surface 28 (or one or more portions of the collar securing surface 28) may not fully extend to the first lateral end 160 of the collar securing ramp 26 and/or may not fully extend to the second lateral end 162 of the collar securing ramp 26.

With reference to the cross-sectional view of FIG. 7A, the locking collar 14 may also include a collar channel 136 that may extend along a collar axis 138 through the locking collar 14 from a first end 140 to a second end 142. The collar axis 138 may have two or more segments, and one or more of the segments may be non-linear, and may have the shape of an arc, for example. The first end 140 of the collar channel 136 may be partially defined by the upper aperture 150 disposed in the upper surface 89 and the second end 142 of the locking collar channel 136 may be defined at least partially by the lateral aperture 152 formed on or disposed in the outer surface 154 of the body portion 105. The collar channel 136 may be further defined by one or more surfaces on or within the locking collar 14, such as one or more surfaces of the collar securing ramp 26, and the one or more surfaces of the collar securing ramp 26 may include all or a portion (or two or more portions) of the collar securing surface 28.

Figure 3B:
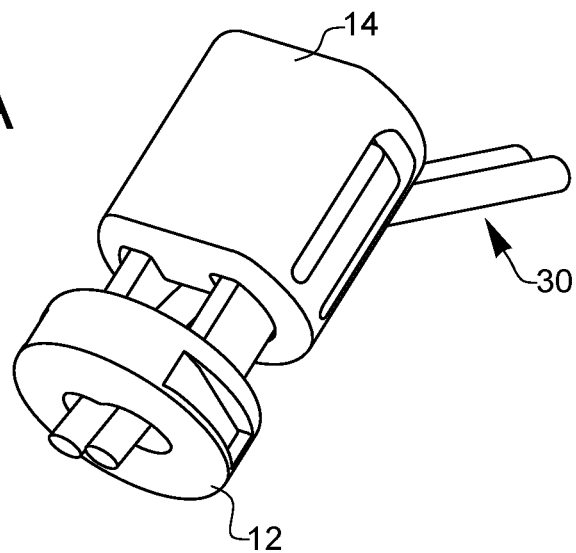
Figure 3C:
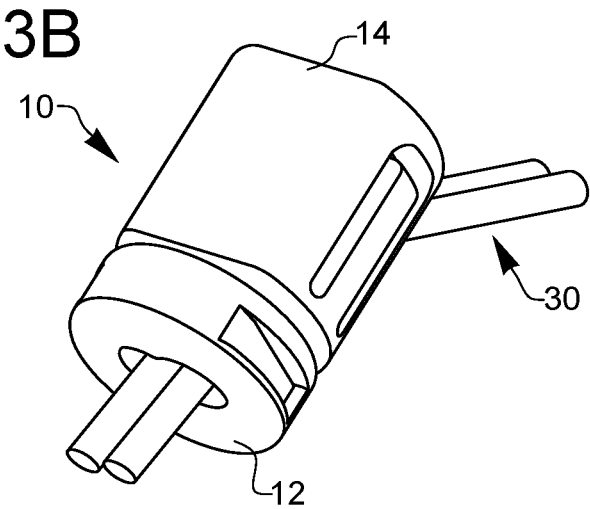
Figure 7C:
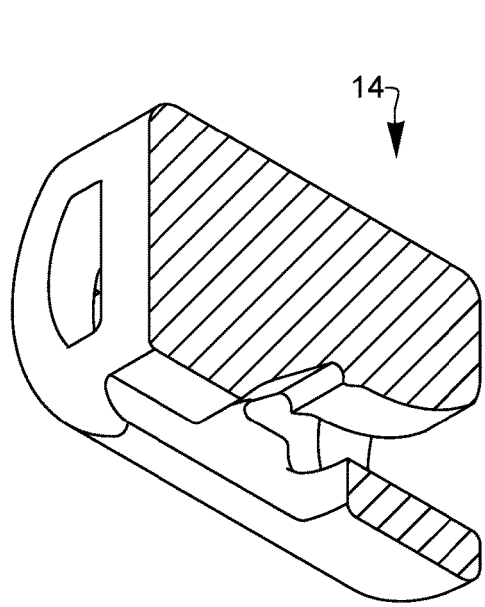
Figure 7D:
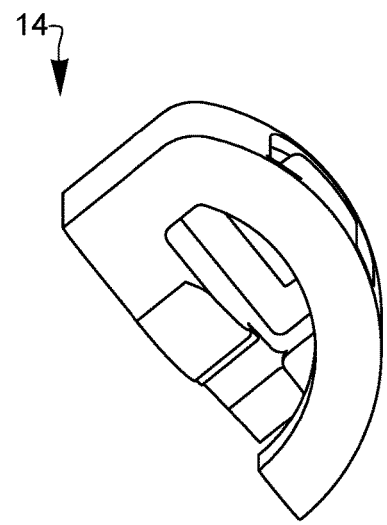

In a procedure, a surgeon may desire to secure a segment of suture 30 that may have been used in the procedure. For example, the segment of suture 30 may be one or more portions of suture, such as one or more of the free ends of suture that have been used to secure tissue of the patient or to secure an object to the tissue of a patient. Regardless of the type of suture or the end function of the segment(s) of suture, the surgeon will feed the segment of suture 30 (along with any further segments of suture 30) through the aperture 16 of the central hub 12 such that a portion of the segment of suture 30 is positioned on the base securing surface 22 and is generally aligned with the hub axis 32, as illustrated in FIG. 3A. The surgeon will next feed the segment of suture 30 through or along the collar channel 136 (see FIG. 7C) of the locking collar 14 such that the segment of suture 30 extends through the upper aperture 150, along the collar securing surface 28, and through the lateral aperture 152. As illustrated in FIG. 3B, the first arm 50 of the central hub 12 is inserted into the first slot 92 of the locking collar 14 (see FIG. 2C) and the second arm 62 of the central hub 12 is inserted into the second slot 114 of the locking collar 14 (see FIG. 2C). The first arm 50 and second arm 62 of the central hub 12 then advanced into the first slot 92 and the second slot 114, respectively, of the locking collar 14 until the first arm mating feature 58 engages the first collar mating feature 60 and the second arm mating feature 70 engages the second collar mating feature 72, as illustrated in FIGS. 2C and 3C.

In such a position, the segment of suture 30 will be disposed under pressure between the base securing surface 22 and the collar securing surface 28, and this pressure will be maintained by the engagement of the first arm mating feature 58 engages the first collar mating feature 60 and the second arm mating feature 70 engages the second collar mating feature 72. The segment of suture 30 will be further retained by the texture, combination of textures, or other surface treatment of the base securing surface 22 and the collar securing surface 28. For example, the edge ridges 172a, 172b, 172c of the corresponding shelves 170a, 17b, 170c of the first and second trough 166a, 166b may dig or apply pressure into portions of the segment of suture 30 when the central hub 12 coupled to the locking collar 14.

The surgeon may position the suture fastening assembly 10 such that the suture fastening assembly 10 maintains a suitable tension the suture when the central hub 12 coupled to the locking collar 14. The surgeon may repeat the process with other desired portions of suture 30 in the manner previously described. Because the suture fastening assembly 10 may be made from an absorbable material, the suture fastening assembly 10 would not require removal from the patient following the procedure. The surgeon may assemble the suture fastening assembly 10 and/or position the segment of suture 30 by hand or with the assistance of one or more devices.

The central hub 12 may be a single, integral part that is injection molded as a single piece part. Similarly, the locking collar 14 may be a single, integral part that is manufactured or fabricated as a single piece part, such as by using an injection molding process or a three-dimensional printing process. However, one or both of the central hub 12 and the locking collar 14 may be an assembly of one or more parts that are coupled, joined, or otherwise assembled to form a final part.

The central hub 12 and the locking collar 14 may each be manufactured or fabricated using any suitable materials. In some embodiments, the central hub 12 and the locking collar 14 may each be manufactured or fabricated using any suitable bioabsorbable or biodegradable material, for example, any suitable collagen-based materials or synthetic materials, such as amino-acid based biodegradable poly (ester amide) fibers, polylactic acid (PLA), polydioxanone, polytrimethylene carbonate, collagenpoly-p-dioxanone (PDS), poly(ethylene terephthalate) (PET), poly(butylene terephthalate) (PBT), polybutesterpolyamidepolytetrafluoroethylene (PTFE), stainless steelpoly(ester amide) (PEA), amino acid poly(ester amide) (AA-PEA), polyglycolic acid (PGA), and poly(lactic-co-glycolic) acid (PLGA).

Various advantages of a suture fastening assembly have been discussed above. Embodiments discussed herein have been described by way of example in this specification. It will be apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and the scope of the claimed invention. The drawings included herein are not necessarily drawn to scale. Additionally, the recited order of processing elements or sequences, or the use of numbers, letters, or other designations therefore, is not intended to limit the claims to any order, except as may be specified in the claims. Accordingly, the invention is limited only by the following claims and equivalents thereto.

What is claimed is:

1. A suture fastening assembly comprising:
a central hub extending along a hub axis from a first end to a second end, the central hub comprising:
- a base portion having a first surface disposed at a first end of the base portion and a second surface disposed at a second end of the base portion, wherein an aperture extends through the base portion, a first end of the aperture being disposed at the first surface and a second end of the aperture being disposed at the second surface;
- a base securing ramp extending from the second surface of the base portion towards the second end of the central hub, the base securing ramp having a base securing surface that extends along a portion of the base securing ramp along a base ramp axis from a first end to a second end, wherein the first end of the base securing ramp is disposed (a) at or adjacent to the second surface of the base portion and (b) adjacent to the second end of the aperture, and wherein the base ramp axis forms a first acute angle with the hub axis;
- a first arm extending along the hub axis from a first end to a second end, wherein the first end of the first arm is coupled to a second portion of the base portion and the second end of the first arm is disposed at or adjacent to the second end of the central hub, wherein a first arm mating feature is disposed at or adjacent to the second end of the first arm; and
- a second arm extending along the hub axis from a first end to a second end, wherein the first end of the second arm is coupled to a third portion of the base portion and the second end of the first arm is disposed at or adjacent to the second end of the central hub, wherein a second arm mating feature is disposed at or adjacent to the second end of the second arm; and a locking collar configured to be coupled to the central hub, the locking collar extending along a locking collar axis from a first end to a second end, the locking collar comprising:
- a first slot adapted to receive at least a portion of the first arm of the central hub;
- a second slot adapted to receive at least a portion of the second arm of the central hub;
- a first collar mating feature configured to engage the first arm mating feature when the portion of the first arm is disposed in the first slot;
- a second collar mating feature configured to engage the second arm mating feature when the portion of the second arm is disposed in the second slot, wherein when the first arm mating feature engages the first collar mating feature and the second arm mating feature engages the second collar mating feature, the locking collar is secured to the first arm is disposed in the first slot;
- a collar securing ramp extending from a first end to a second end, the collar securing ramp having a collar securing surface extending along a collar ramp axis from a first end to a second end, the collar ramp axis forming a second acute angle with the hub axis,
wherein when a segment of suture is disposed through the aperture of the base portion and along the base securing surface of the base portion and when the locking collar is secured to the central hub, a first portion of the segment of suture is engaged by one or more portions of the base securing surface and a second portion of the segment of suture is engaged by one or more portions of the collar securing surface such that the segment of suture is secured between the base securing surface and the collar securing surface.

2. The suture fastening assembly of claim 1, wherein the base portion has a cylindrical shape having a substantially round cross-section along the hub axis.

3. The suture fastening assembly of claim 1, wherein the central hub and the locking collar are manufactured from a bioabsorbable material.

4. The suture fastening assembly of claim 1, wherein the first slot extends from a first end to a second end, the first end of the first slot being disposed at the first end of the locking collar, and wherein the second slot extends from a first end to a second end, the first end of the second slot being disposed at the first end of the locking collar.

5. The suture fastening assembly of claim 1, wherein the first end of the collar securing ramp is disposed at or adjacent to the first end of the locking collar.

6. The suture fastening assembly of claim 1, wherein the first end of the collar securing surface is disposed at or adjacent to the first end of the collar securing ramp.

7. The suture fastening assembly of claim 1, wherein the base securing surface is non-planar.

8. The suture fastening assembly of claim 1, wherein the one or more portions of the base securing surface are one or more of a first plurality of ridges.

9. The suture fastening assembly of claim 1, the locking collar further comprising:
- a first arm extending along the collar axis from a first end to a second end, wherein the first end of the first arm is offset from the first end of the locking collar and the second end of the first arm is offset from the second end of the locking collar, and wherein the first collar mating feature is disposed on a portion of the first arm; and
- a second arm extending along the collar axis from a first end to a second end, wherein the first end of the second arm is offset from the first end of the locking collar and the second end of the second arm is offset from the second end of the locking collar, and wherein the second collar mating feature is disposed on a portion of the second arm.

10. The suture fastening assembly of claim 1, wherein the first collar mating feature is disposed at or adjacent to the second end of the first arm of the locking collar and the second collar mating feature is disposed at or adjacent to the second end of the second arm of the locking collar.

* * * * *